US008532336B2

(12) United States Patent
Bobbitt et al.

(10) Patent No.: US 8,532,336 B2
(45) Date of Patent: Sep. 10, 2013

(54) MULTI-MODE VIDEO EVENT INDEXING

(75) Inventors: Russell P. Bobbitt, Hawthorne, NY (US); Lisa M. Brown, Hawthorne, NY (US); Rogerio S. Feris, Hawthorne, NY (US); Arun Hampapur, Hawthorne, NY (US); Yun Zhai, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 12/857,755

(22) Filed: Aug. 17, 2010

(65) Prior Publication Data
US 2012/0045090 A1   Feb. 23, 2012

(51) Int. Cl.
*G06K 9/00* (2006.01)

(52) U.S. Cl.
USPC ............ 382/103; 382/107; 348/143; 348/169

(58) Field of Classification Search
USPC .......... 382/103, 107; 348/143–160, 169–172
See application file for complete search history.

(56) References Cited

U.S. PATENT DOCUMENTS

| | | | |
|---|---|---|---|
| 5,602,760 A | 2/1997 | Chacon et al. | |
| 6,037,976 A | 3/2000 | Wixson | |
| 6,434,254 B1 | 8/2002 | Wixson | |
| 6,680,748 B1 | 1/2004 | Monti | |
| 7,002,480 B2 * | 2/2006 | Kobayashi et al. | 340/602 |
| 7,492,820 B2 | 2/2009 | Puri | |
| 7,526,102 B2 | 4/2009 | Ozer | |
| 2004/0080627 A1 * | 4/2004 | Kroll et al. | 348/221.1 |
| 2004/0178760 A1 * | 9/2004 | Kobayashi et al. | 318/483 |
| 2005/0083184 A1 * | 4/2005 | Bos et al. | 340/435 |
| 2005/0175091 A1 | 8/2005 | Puri et al. | |
| 2008/0118106 A1 | 5/2008 | Kilambi et al. | |
| 2008/0129541 A1 * | 6/2008 | Lu et al. | 340/905 |
| 2009/0103888 A1 | 4/2009 | Murabayashi et al. | |
| 2009/0222388 A1 | 9/2009 | Hua et al. | |
| 2010/0124356 A1 | 5/2010 | Hampapur et al. | |
| 2010/0135528 A1 | 6/2010 | Bobbitt et al. | |
| 2010/0258633 A1 * | 10/2010 | Wang | 235/472.01 |
| 2011/0080479 A1 * | 4/2011 | Trumbo et al. | 348/143 |
| 2011/0081044 A1 * | 4/2011 | Peeper et al. | 382/103 |
| 2012/0237193 A1 * | 9/2012 | Kawarada | 396/95 |
| 2013/0002613 A1 * | 1/2013 | Keam | 345/175 |

OTHER PUBLICATIONS

Youtian Du et al, Activity recognition through multi-scale motion detail analysis, Elsevier B.V., Sep. 12, 2007, pp. 3561-3574.

(Continued)

*Primary Examiner* — Aaron W Carter
(74) *Attorney, Agent, or Firm* — Patrick J. Daugherty; Driggs, Hogg, Daugherty & Del Zoppo Co., LPA

(57) ABSTRACT

Multi-mode video event indexing includes determining a quality of object distinctiveness with respect to images from a video stream input. A high-quality analytic mode is selected from multiple modes and applied to video input images via a hardware device to determine object activity within the video input images if the determined level of detected quality of object distinctiveness meets a threshold level of quality, else a low-quality analytic mode is selected and applied to the video input images via a hardware device to determine object activity within the video input images, wherein the low-quality analytic mode is different from the high-quality analytic mode.

24 Claims, 5 Drawing Sheets

(56) References Cited

OTHER PUBLICATIONS

Philip DeCamp et al, A Human-Machine Collaborative Approach to Tracking Human Movement in Multi-Camera Video, ACM, Jul. 8-10, 2009, pp. 1-8.

Andreas Girgensohn et al, Determining Activity Patterns in Retail Spaces through Video Analysis, ACM, Oct. 26-31, 2008, pp. 889-892.

Andrew Senior et al, Appearance Models for Occlusion Handling, Elsevier Science, Nov. 11, 2004, pp. 1-22.

Thanarat Horprasert et al, A Statistical Approach for Real-time Robust Background Substraction and Shadow Detection, Computer Vision Laboratory, University of Maryland, pp. 1-19, 1999.

Ying-Li Tian et al, Robust and Efficient Foreground Analysis for Real-time Video Surveillance, IBM T.J. Watson Research Center, pp. 1-6, 2005.

Dongkeun Kim et al: "Smoke Detection in Video", Computer Science and Information Engineering, 2009 WRI World Congress on, IEEE, Piscataway, NJ, USA, Mar. 31, 2009, pp. 759-763.

Alexandros Iosifidis et al: "Real-time Video Surveillance by a Hybrid Static/Active Camera Mechatronic System", Advanced Intelligent Mechatronics (AIM), 2010 IEEE/ASME International Conference on, IEEE, Piscataway, NJ, USA, Jul. 6, 2010, pp. 84-89.

Liu Y et al: "Robust Image-based Detection of Activity for Traffic Control", Canadian Journal of Electrical and Computer Engineering/Revue Canadienne De Genie Electrique et Informatique, Engineering, USA, vol. 28, No. 2, Apr. 1, 2003, pp. 63-67.

Cucchiara, R et al: "Image Analysis and Rule-based Reasoning for a Traffic Monitoring System", Intelligent Transportation Systems, 1999, Proceedings, 1999 IEEE/IEEJ/JSAI, International Conference on Tokyo, Japan, Oct. 5-8, 1999, Piscataway, NJ, USA, IEEE, US, pp. 758-763.

Hautiere, N., Bigorgne E., Bossu J. and Aubert D.: "Meteorological Conditions Processing for Vision-based Traffic Monitoring", The 8th International Workshop on Visual Surveillance (VS2008), 2008.

Zhen Jia et al: "Real-time Content Adaptive Contrast Enhancement for See-through Fog and Rain'" Acoustics Speech and Signal Processing (ICASSP), 2010 IEEE International Conference on. IEEE, Piscataway, NJ, USA, Mar. 14, 2010, pp. 1378-1381.

Weng, T L et al: "Weather-adaptive Flying Target Detection and Tracking from Infrared Video Sequences," Expert Systems With Applications, Oxford, GB, vol. 37, No. 2, Mar. 1, 2010, pp. 1666-1675.

Ying-Li Tian et al: "IBM Smart Surveillance system (S3): Event Based Video Surveillance System with an Open and Extensible Framework", Machine Vision and Applications, Springer, Berlin, DE, vol. 19, No. 5-6, Jun. 24, 2000, pp. 315-327.

Hampapur, Arun et al: "S3-R1: The IBM Smart Surveillance System-Release 1", Proceedings of the ACM SIGMM 2004 Workshop on Effective Telepresence, ETP, New York, NY, Oct. 15, 2004, New York, NY : ACM, US, pp. 59-62.

Communication Relating to the Partial International Search for PCT/EP2011/064088, dated Jan. 2, 2012.

Duan-Yu Chen et al: "Spatiotemporal Motion Analysis for the Detection and Classification of Moving Targets". IEEE Transactions on Multimedia, IEEE Service Center, Piscataway, NJ, US, vol. 10, No. 8, Dec. 1, 2008, pp. 1578-1591.

Hampapur A et al: "Smart Surveillance: Applications, Technologies and Implications", Information. Communications and Signal Processing, 2003 and Fourth Pacific Rim Conference on Multimedia, Proceedings of the 2003 Joint Conference of the Fourth International Conference on Singapore Dec. 15-18, 2003, Piscataway, NJ, USA, IEEE, vol. 2, pp. 1133-1138.

International Search Report for PCT/EP2011/064088 dated Mar. 6, 2012.

\* cited by examiner

MULTI-MODE VIDEO EVENT INDEXING

BACKGROUND

The present invention relates to the analysis of activities in videos, and more particularly to accurately determining and distinguishing object movements and activities represented thereby.

Video surveillance enables object monitoring through video displays of one or more areas remote from a human monitor. Exemplary applications include security surveillance of public and private areas, for example parking lots for human and vehicle movements, assembly areas such as train stations and entertainment halls for abandoned baggage or objects, borders and doorways for unauthorized entry, secured areas for unauthorized vehicle or object movements and removals, etc. However, human review and analysis of video feeds is time consuming and perhaps inefficient with respect to human resources allocations, and accordingly it is desirable to implement automated systems for video analysis.

Automated analysis of videos for determining object movements, activities and behaviors presents a number of challenges. Variable volumes of activity data, weather conditions, human or object crowding within a scene, geographical area features and other factors often prove problematic for accurate results in making such determinations through video analytics algorithms.

BRIEF SUMMARY

One embodiment of a method for multi-mode video event indexing includes determining a quality of object distinctiveness with respect to images from a video stream input. A high-quality analytic mode is selected from multiple modes and applied to video input images via a hardware device to determine object activity within the video input images if the determined level of detected quality of object distinctiveness meets a threshold level of quality, else a low-quality analytic mode is selected and applied to the video input images via a hardware device to determine object activity within the video input images, wherein the low-quality analytic mode is different from the high-quality analytic mode.

In another embodiment, a computer system for multi-mode video event indexing comprises a processing unit, computer readable memory and a computer readable storage system having program instructions to determine a quality of object distinctiveness with respect to images from a video stream input; select from a plurality of video analytics modes and apply a high-quality analytic mode to the video input images to determine object activity within the video input images if the determined level of detected quality of object distinctiveness meets a threshold level of quality. Program instructions are also to select a low-quality analytic mode from the plurality of video analytics modes and apply the low-quality analytic mode to the video input images to determine object activity within the video input images if the determined level of detected quality of object distinctiveness does not meet the threshold level of quality, the low-quality analytic mode different from the high-quality analytic mode.

In another embodiment, a computer program product for multi-mode video event indexing comprises a computer readable storage medium and program instructions stored thereon to determine a quality of object distinctiveness with respect to images from a video stream input; select a high-quality analytic mode from a plurality of video analytics modes and apply the high-quality analytic mode to the video input images to determine object activity within the video input images if the determined level of detected quality of object distinctiveness meets a threshold level of quality; and select a low-quality analytic mode from the plurality of video analytics modes and apply the low-quality analytic mode to the video input images to determine object activity within the video input images if the determined level of detected quality of object distinctiveness does not meet the threshold level of quality, the low-quality analytic mode different from the high-quality analytic mode.

In another embodiment, a service for multi-mode video event indexing provides a computer infrastructure that determines a quality of object distinctiveness with respect to images from a video stream input; selects a high-quality analytic mode from a plurality of video analytics modes and applies the high-quality analytic mode to the video input images to determine object activity within the video input images if the determined level of detected quality of object distinctiveness meets a threshold level of quality; and selects a low-quality analytic mode from the plurality of video analytics modes and applies the low-quality analytic mode to the video input images to determine object activity within the video input images if the determined level of detected quality of object distinctiveness does not meet the threshold level of quality, wherein the low-quality analytic mode is different from the high-quality analytic mode.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
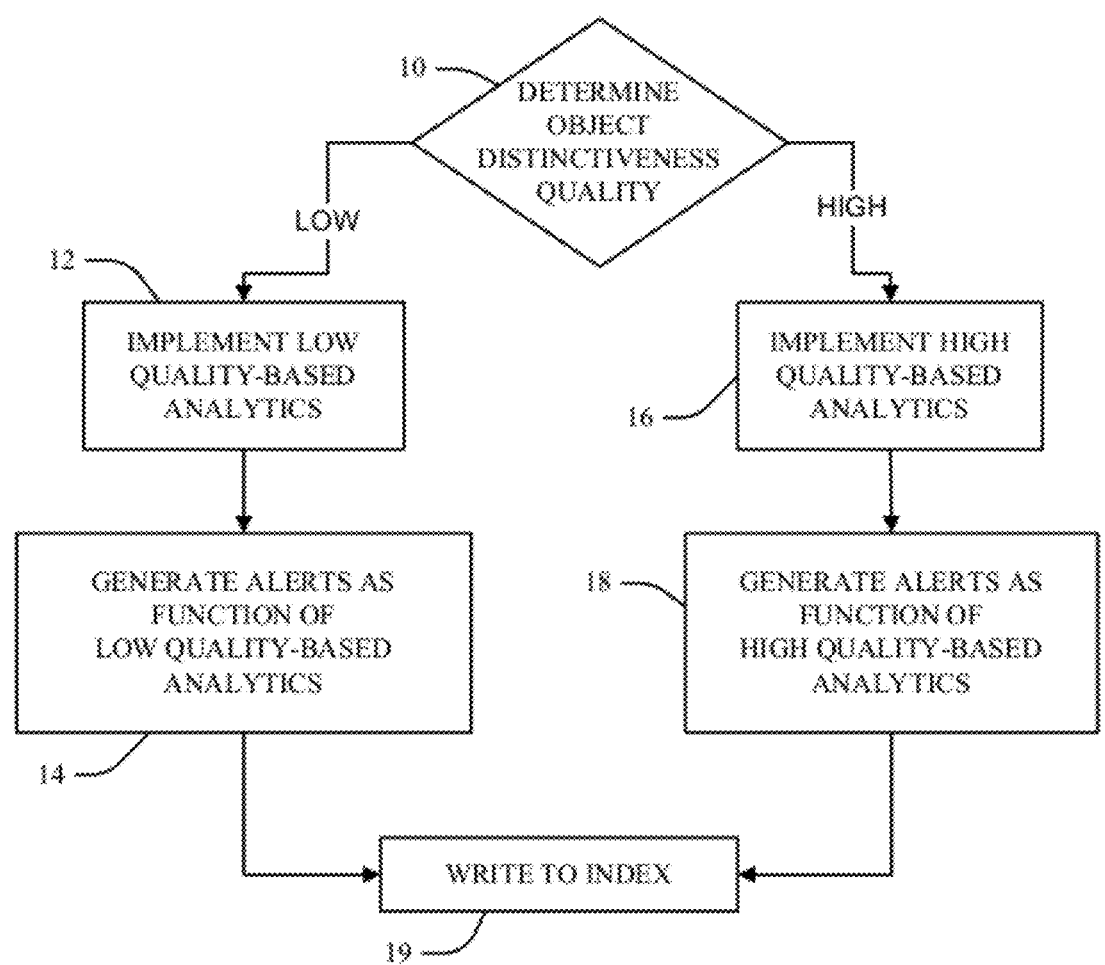
FIG. 1 illustrates a method or system for determining object movements according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Historically, compliance of object activity with policies, regulations, etc. has typically been enforced through direct human surveillance. For example, safety and security personnel may watch cameras trained on certain areas to discover deviations from safety policies, trespassing, theft, unauthorized access to restricted areas, etc. However, human visual attention may be ineffective, particularly for large volumes of video data. Due to many factors, illustratively including an infrequency of activities of interest, a fundamental tedium associated with the task and poor reliability in object tracking in environments with visual clutter and other distractions, human video surveillance may be both expensive and ineffective.

Automated video surveillance systems and methods are also proposed or known, wherein computers or other programmable devices directly analyze video data and attempt to determine the occurrence of activities of concern. However, determining and differentiating human and object movements within a video stream object in prior art automated video surveillance systems and methods is often not reliable in realistic, real-world environments and applications, sometimes due to clutter, poor or variable lighting and object resolutions and distracting competing visual information.

Referring now to FIG. 1, a dual-mode embodiment of a multi-mode video event indexing method, infrastructure or system for determination of object movements according to the present invention is illustrated. At 10 a quality of object distinctiveness is determined with respect to images from a video stream input, and accordingly an appropriate mode of video analytics is selected for application to the video stream input. The present example makes a binary high or low quality determination, wherein a high quality-based analytic mode 12 is selected for determining movement of objects, and otherwise a low-quality-based mode 16 is selected. It will be understood that detecting an image quality relative to object distinctiveness within an image comprehends and selecting an appropriate mode of video analytics according to the present invention comprehends more than two different modes or levels; for example, three different modes may be selectable for each of low, medium and high levels or qualities of object distinctiveness, or low and high quality modes may be applied in combination for a medium level, and still more options may be presented.

Embodiments of the present invention also provide for different alert generations for the different modes: in the present example, implementation of the object tracking-based mode 12 results in generating alerts at 14 as a function of tracking-based analytics, whereas implementation of the non-tracking-based mode 16 results in generating alerts at 18 as a function of the non-tracking-based analytics. Analytic results at 12 and 16 and alert generation results at 14 and 18 may be written to an index at 19 for reporting and further analysis, for example to a database for data analysis.

Figure 2:
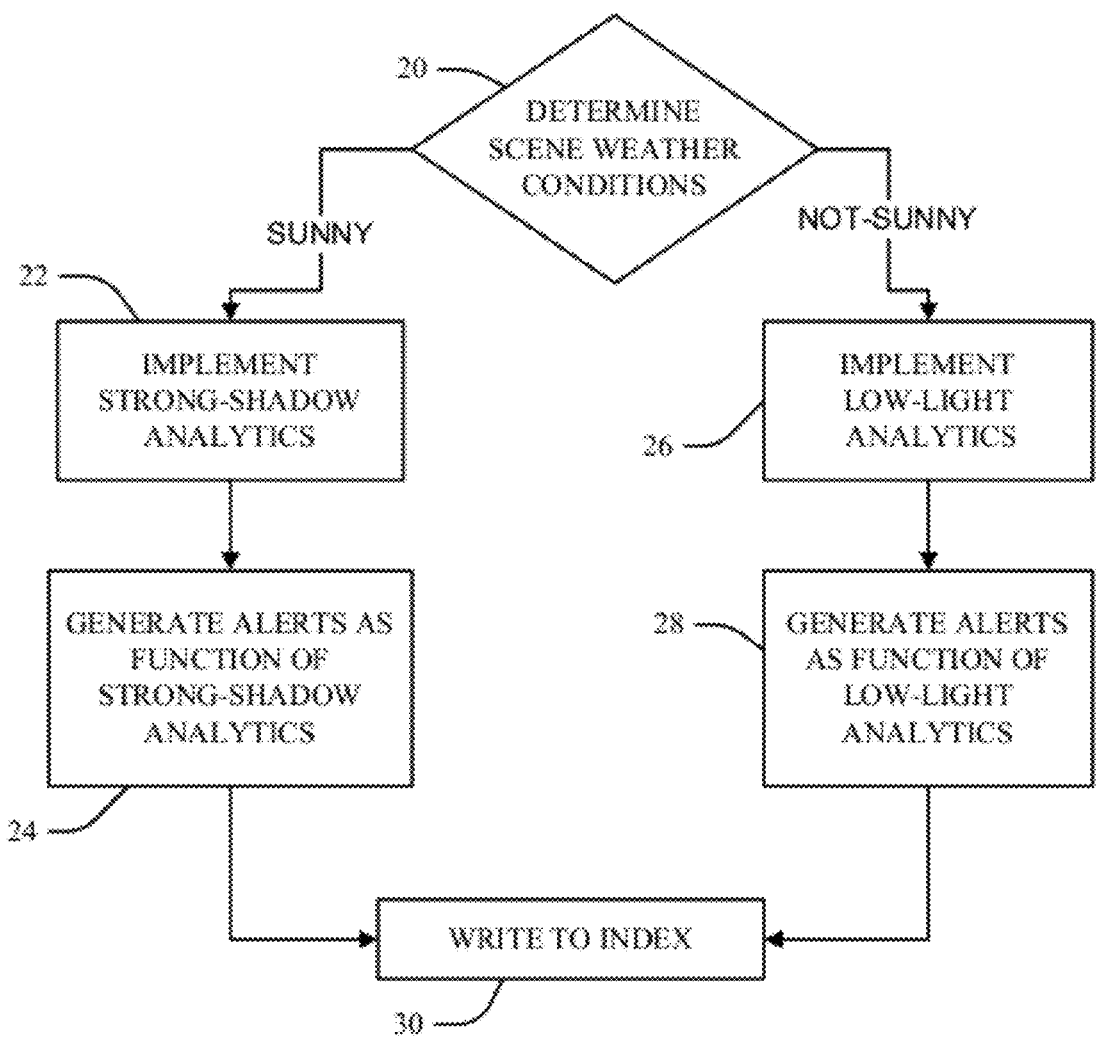
FIG. 2 illustrates an embodiment according to the present invention.

The present invention provides for the automatic selection of an appropriate video analytic process in response to a quality of object distinctiveness indicating reliability in results, including of alerts and alarm generation, in identifying, recognizing and tracking object movements. The determination of one or more qualities of object distinctiveness with respect to the video images may comprehend one or more of a variety of criteria and processes. For example, FIG. 2 illustrates an embodiment according to the present invention for automatically switching to an appropriate video parsing device at 20 in response to determining and distinguishing different weather conditions of the video image, including but not limited to sunny, cloudy or changing levels of cloudiness (e.g. fully cloudy versus partially cloudy), rainy, snowy, etc. Recognizing a specified weather condition at 20 may be accomplished through video analytics applied to images of the video input, for example determining a sunny or well-lit scene through measuring a light intensity of the video image and comparing it to a threshold illumination value. The recognition at 20 may also be responsive to other inputs or selection processes, for example a separate weather reporting application may report clear skies during certain hours known to comprise appropriate daylight hours of the scene.

When the weather is sunny, outdoor moving objects often possess casted shadows with clear boundaries, and thus recognition of sunny daylight conditions at 20 results in selection of a strong-shadow analytic mode or device 22 that provides for object detection and tracking, one that handles strong shadows well, for example by removing or otherwise accounting for strong shadows in image analytics, and wherein alert determination at 24 is responsive to the strong-shadow analytic device 22 outputs. Otherwise, if the scene is not sunny, for example cloudy, rainy, snowy, foggy, twilight, dawn, etc., where the lighting is dimmer and object shadows are not as distinctive, then a low-light analytic mode or device 26 is selected, for example one that parses video events without using shadow removal techniques, and wherein alert determination at 28 is responsive to the low-light analytic device 26 outputs. Analytic results at 22 and 26 and alert generation results at 24 and 28 are accordingly written to an index at 30 for reporting and further analysis.

Figure 3:
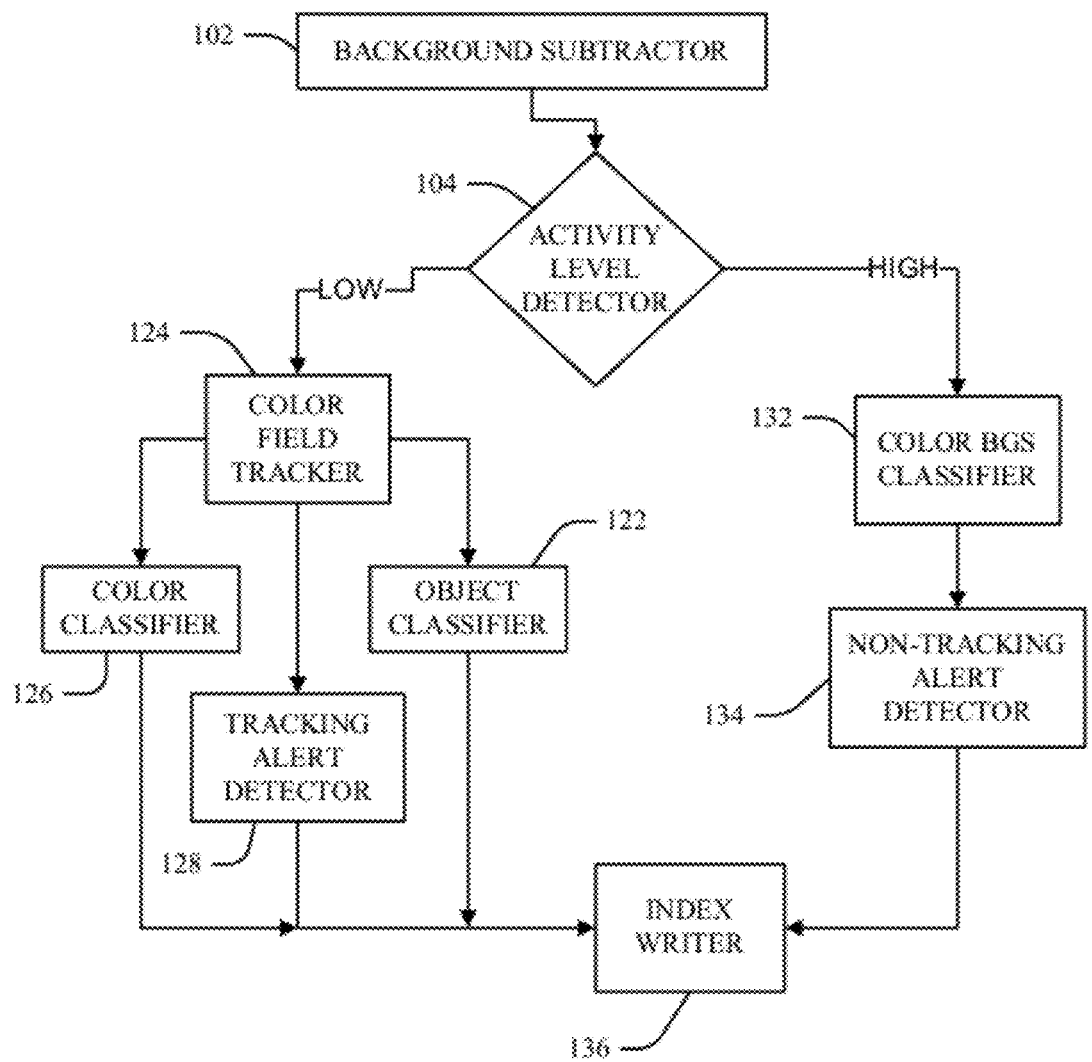
FIG. 3 illustrates another embodiment according to the present invention.

Embodiments of the present invention may determine a level of object activity within a video image through background subtraction methods, and then select an appropriate mode of object movement determination; for low levels of activity, each moving object may be tracked as it moves across a scene, but to handle high-activity scenes (for example, those typical in certain hours of the day in urban scenarios), the embodiments determine object movements through object appearance attribute retrieval and processing without object tracking. Thus, FIG. 3 illustrates an embodiment which applies background subtraction (BGS) to a video stream input at 102 in order to detect foreground object activity as a difference between current frame image information and static information of a contextual background of the image. At 104 a level of foreground object activity is determined after the background subtraction, and accordingly an appropriate mode of video analytics is selected for application to the video. Thus, an object tracking-based mode Color Field Tracker 124 is selected for lower levels of activity appropriate for determining movement of objects through tracking distinct foreground objects; and a non-tracking-based mode Color BGS Classifier 132 is selected for higher activity levels, one more appropriate for determining object movements in lower quality from extracted appearance attributes of foreground objects, without object tracking.

Embodiments as illustrated in FIG. 3 may also be appropriate for application in distinguishing weather or illumination scene conditions, for example as described with respect to the embodiment of FIG. 2, wherein rather than select between strong shadow modes/devices 22 and low-light modes/devices 26, embodiments may select between tracking modes/devices 124 and non-tracking modes/devices 132. Thus, recognition at 104 that video images are acquired under rain, snow or fog conditions may indicate use of high-level, non-tracking modes/devices, as opposed to sunny and clear weather scene images, more suitable for use of the low-level, tracking mode/devices.

Determining a quality of image of the video input at 104 may comprise determining an amount of illumination in a scene of the video input and selecting an appropriate mode by comparison to a specified level of illumination; for example, nighttime or more poorly illuminated scenes may result in higher foreground-to-background ratios relative to sunlit or better illuminated scenes, indicating use of the high-level, non-tracking mode 132. Video inputs from moving video cameras may also indicate use of high-level, non-tracking modes/devices 132, as opposed to those taken from stationary or relatively more stable cameras more suitable for use of the low-level, tracking modes/devices 124.

Other image qualities may also indicate relative object activity at 104. For example, higher densities of foreground objects or activity may result from cluttered or poor image quality, triggering a "high-level" choice of non-tracking analytics 124, even where low levels of object motion may be occurring.

Some embodiments of the present invention perform activity level detection at 104 through use of a switch determination module that takes the results of the BGS at 102 and looks at density of the image to determine an activity level or quality as a function of a ratio of foreground to background. Thus, some examples may utilize a threshold foreground density value (e.g. a percentage of 60%) relative to the entire image, densities above which triggering selection of the high-level mode, non tracking analytics at 104. Another example uses 40% as a threshold density percentage, and still other percentages may be practiced.

Embodiments of the present invention may also perform activity level detection at 104 as a function of a stability of ratio data, for example through use of a temporal consistency analysis. Thus, some embodiments may require that one or more threshold density percentages (60%, 40%, etc.) be exceeded at 10 at least over one or more specified time periods and, if not, the low level/tracking-based analytics may still be selected even if the threshold has been exceeded. In one example, if a threshold density (e.g. 60%) met at a first, earlier time drops to a specified minimum value (e.g. to no more than 30%) at a subsequent, second time within an elapsed time period chosen to represent a stability period or duration (e.g. within one or two seconds or other time periods), then the low level/tracking-based analytics may also be selected at 10 even though the threshold density was exceeded. Stabilities and/or densities may also be considered as averages over time, and in some embodiments by further weighting some time periods relative to others (for example, weighting more recent times or averages of times relatively higher than older times and/or averages).

Activities and levels thereof may comprehend a variety of characteristics and actions, for example numbers of object moving, speed or acceleration of one or more objects, relative to static background or other moving objects, relative quality of image (e.g. different relative lighting levels, such as from sunshine, clouds, nighttime, fog; occlusions from rain, snow or other environmental elements and factors, etc.). Other examples of or causes for divergent foreground-to-background ratio values may also occur, and the present invention is adaptable to respond to said causal agents by selecting the appropriate high, low or even intermediate mode.

More particularly, embodiments of the present invention may determine a level of object activity within a video image through background subtraction methods, and then select an appropriate mode of object movement determination; for low levels of activity, each moving object may be tracked as it moves across a scene, but to handle high-activity scenes (for example those typical in certain hours of the day in urban scenarios), the embodiments determine object movements through object appearance attribute retrieval and processing without object tracking.

The background subtractor 102 may apply a statistical approach to background subtraction, for example as taught by T. Horprasert, D. Harwood and L. S. Davis in "A statistical approach for real-time robust background subtraction and shadow detection," ICCV Frame-Rate Workshop, 1999. Such embodiments make background subtraction robust to illumination changes by statistically modeling the background independently at each pixel. An exemplary estimation process thus computes the brightness distortion and color distortion in red-green-blue (RGB) color space wherein each pixel $\{i\}$ is modeled by a 4-tuple $(E_i, s_i, a_i, b_i)$, where $\{E_i\}$ is a vector with the means of the pixel's red, green, and blue components computed over a number $\{N\}$ of background frames; $\{s_i\}$ is a vector with the standard deviations of the color values; $\{a_i\}$ is the variation of the brightness distortion; and $\{b_i\}$ is the variation of the chromaticity distortion.

By comparing the difference between the background image and the current image, a given pixel $\{i\}$ may be classified into one of four categories: original background, shaded background or shadow, highlighted background, and foreground. Categorization thresholds may be calculated automatically by statistical learning wherein histograms of a normalized brightness distortion, a normalized chromaticity distortion are constructed from combined data through a long sequence captured during a background learning period, and wherein thresholds are automatically selected according to the desired detection rate as a function of the histograms. Foreground pixels may thus be passed to the appropriate analytics mode chosen at 104, with remaining pixels grouped together as background, and isolated pixels may be removed and a morphological closing operator applied to join nearby foreground pixels.

Active background estimation may also be provided to deal with objects moving in training images wherein a first frame is stored as a prototype background image and differenced with subsequent training frames, the areas of significant difference defining moving objects excluded when the statistical background model is constructed. Variations in illumination not seen in the training set are handled by modifying the background subtraction method and process algorithms by an overall gain control that applies a global scaling factor to pixel intensities before comparing them to the stored means, the scale factor calculated on non-foreground regions of a previous image under an assumption that lighting changes between adjacent frames are small; and further through background adaptation employed by blending in pixel values of current non-foreground regions, in one aspect slowly learning local changes in appearance not attributable to moving objects. Said processes reduce the sensitivity of the background estimation algorithms to lighting changes between and during datasets.

Embodiments of the background subtractor 102 may also apply a Gaussian mixture model approach with respect to each pixel in a video image scene. In one example, for a mixture of $\{K\}$ Gaussians chosen from 3 to 5, the probability of a pixel $\{X\}$ at time $\{t\}$, may be described as:

$$P(X_t) = \sum_{i=1}^{K} \omega_{i,t} * \eta\left(X_t, \mu_{i,t}, \sum_{i,t}\right), \quad (1)$$

where $$\eta\left(X_t, \mu, \sum\right) = \frac{1}{(2\pi)^{\frac{n}{2}}|\Sigma|^{\frac{1}{2}}} e^{-\frac{1}{2}(X_t-\mu_t)^T \Sigma^{-1}(X_t-\mu_t)}, \quad (2)$$

and $$\omega_{i,t} = (1-\alpha)\omega_{i,t-1} + \alpha(M_{k,t}). \quad (3)$$

Wherein $\{\mu\}$ is the mean, $\{\alpha\}$ is the learning rate and $\{M_{k,t}\}$ is 1 for the model which matched, and 0 for the remaining models. By assuming the red, green, and blue pixel values are independent and have the same variances:

$$\Sigma_{k,t} = \Sigma_k^2 I. \quad (4)$$

After the Gaussians are ordered by the value of $\{\omega/\alpha\}$, the first $\{B\}$ distributions are chosen as the background model, where $$B = \mathrm{argmin}_b\left(\sum_{k=1}^{b} \omega_k > T\right), \quad (5)$$

Where $\{T\}$ is the minimum portion of the background model. In one exemplary implementation on both grayscale and RGB video inputs, for three Gaussians (K=3), $\alpha$ may be set to 0.005, and T to 0.4.

Mixture of Gaussians methods and system may generate large areas of false positive foreground when there are quick lighting changes. Some embodiments of the present invention address this issue by integrating the texture information to the foreground mask for removing the false positive areas, as texture in the false positive foreground areas which is caused by lighting changes should be similar to the texture in the background. The gradient value is less sensitive to lighting changes, enabling derivation of an accurate local texture difference measure. Thus, a texture similarity measure may be defined at pixel $\{X\}$ between a current frame and a background image as:

$$S(X) = \frac{\sum_{u \in W_x} 2\|g(u)\| \cdot \|g_b(u)\| \cos\theta}{\sum_{u \in W_x} (\|g(u)\|^2 + \|g_b(u)\|^2)}, \quad (6)$$

where $\{W_x\}$ denotes the $\{M$ by $N\}$ neighborhood centered at pixel $\{X\}$, $\{g\}$ and $\{g_b\}$ is the gradient vector of the current frame and the background image respectively, and $\{\theta\}$ is the angle between the vectors. The gradient vector $\{g(X)=(g^x(X), g^y(X))\}$ and the partial derivatives $\{g^x(X)\}$ and $\{g^y(X)\}$ are obtained by a Sobel operator. In the false positive foreground areas caused by quick lighting changes, there are no texture changes between the current frame and the background, therefore {S(X)≈1}. The foreground mask will be removed for the areas with {S(X)≧$T_s$}. In some embodiments, the similarity threshold is set as {$T_s$=0.7}.

Mixture of Gaussians methods and systems may use color information for shadow removal. Some embodiments of the present invention address this issue with respect to grayscale images through use of intensity information instead of color information. For example, the normalized cross-correlation of the intensities may be calculated at each pixel of the foreground region between the current frame and the background image. For pixel {X} in the {M by N} neighborhood, the normalized cross-correlation may be calculated as:

$$NCC(X) = \frac{\left(\sum_{u \in W_x} I_t(u) \cdot I_b(u) - \frac{1}{MN} \sum_{u \in W_x} I_t(u) \sum_{u \in W_x} I_b(u)\right)}{\sqrt{\left(\sum_{u \in W_x} I_t^2(u) - \frac{1}{MN}\left[\sum_{u \in W_x} I_t(u)\right]^2\right)\left(\sum_{u \in W_x} I_b^2(u) - \frac{1}{MN}\left[\sum_{u \in W_x} I_b(u)\right]^2\right)}} \quad (7)$$

Where {$W_x$} denotes the {M by N} neighborhood centered at pixel {X}, {$I_t$(u)} and {$I_b$(u)} is the intensity at pixel {u} of the current frame and the background, respectively. The pixel {X} is shadow if {NCC(X)≧$T_s$} and {$I_t$(X≧$T_I$)}, wherein the constraint {$I_t$(X≧$T_I$)} may be added to avoid the detection of shadows in very dark areas. Otherwise, the pixel {X} is real foreground.

Referring again to FIG. 3, a low activity level indicated/detected at 104 results in selection of a tracking-based analytic process/method comprising a color field tracker 124, an object classifier 122, a color classifier 126 and a tracking alert detector 128. The color field tracker 124 uses an appearance-based modeling to resolve complex structures in a track lattice produced by bounding-box tracking. More particularly, the foreground regions of each video frame are grouped into connected components; in some embodiments, a size filter is used to remove small components. Each foreground component is described by a bounding box and an image mask, which indicates those pixels in the bounding box that belong to the foreground, and wherein the set of foreground pixels may be designated {F}.

Figure 4A:
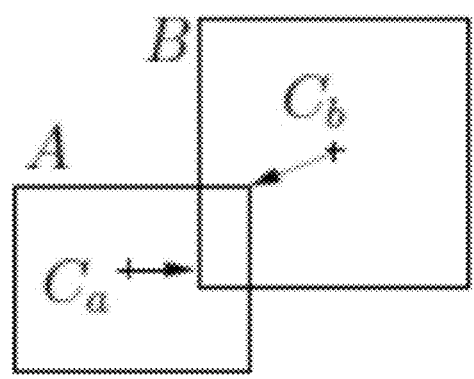
FIGS. 4a and 4b are graphical illustrations of bounding box distance measures according to the present invention.
Figure 4B:
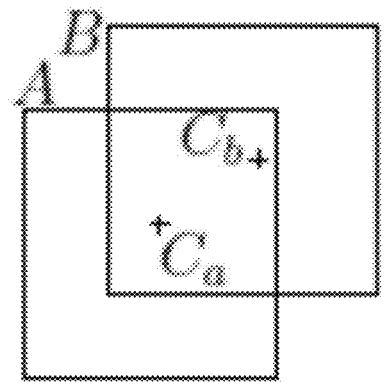

FIGS. 4a and 4b illustrate a bounding box distance measure according to the present invention. For each successive frame, a correspondence process attempts to associate each foreground region with one existing track by constructing a distance matrix showing the distance between each of the foreground regions and all the currently active tracks. Thus, the distance between bounding boxes A and B in FIG. 4a is the lower of the distance from the centroid {$C_a$} of A to the closest point on B or from the centroid {$C_b$} of B to the closest point on A. If either centroid {$C_a$} or {$C_b$} lies within the other bounding box, as shown in FIG. 4b, then the distance is zero. In one aspect, using a bounding box distance as opposed to a Euclidean distance between the centroids {$C_a$} and {$C_b$} avoids a large jump in the Euclidean distance when two bounding boxes or objects A and B merge or split. A time distance between observations may also be added in, in one aspect to penalize tracks for which no evidence has been seen for some time.

The bounding box distance matrix may then be represented as binary data, resulting in a correspondence matrix associating tracks with foreground regions and having rows corresponding to existing tracks and columns corresponding to foreground regions in the current segmentation. Analysis of the correspondence matrix in one embodiment produces four possible results: an existing object, a new object, a merge detected and a split detected. More particularly, for well-separated moving objects, the correspondence matrix will have at most one non-zero element in each row or column, thus associating each track with one foreground region and each foreground region with one track, respectively. Columns with all zero elements represent new objects in the scene which are not associated with any track, and result in the creation of a new track. Rows with all zero elements represent tracks that are no longer visible (because they left the scene, or were generated because of artifacts of the background subtraction).

In the case of merging objects, two or more tracks may correspond to one foreground region, i.e. a column in the correspondence matrix may have more than one non-zero entry. When objects split, for example when people in a group walk away from each other, a single track will correspond to multiple foreground regions, resulting in more than one non-zero element in a row of the correspondence matrix. When a single track corresponds to more than one bounding box, all those bounding boxes are merged together, and processing proceeds. If two objects hitherto tracked as one should separate, the parts continue to be tracked as one until they separate sufficiently that both bounding boxes do not correspond to the track, and a new track is created.

Once a track is created, an appearance model of the object is initialized. This appearance model is adapted every time the same object is tracked into the next frame. On the detection of object merges, the appearance model is used to resolve the ambiguity.

For each track, the color field tracker 124 builds a red-green-blue (RGB) color appearance model {$M_{RGB}$(x)} representative of the appearance of each pixel {x} of an object, and an associated probability mask {$P_c$(x)} which represents the likelihood of the object being observed with respect to the pixel. For simplicity of notation, {x} represents the pixel coordinates, and which are assumed to be image coordinates, but in practice the appearance models model local regions of the image only, normalized to the current centroid, which translate with respect to the image coordinates. However, at any time an alignment is known, allowing calculation of {$P_c$} and {$M_{RGB}$} for any point {x} in the image, and wherein {$P_c$(x)} is zero outside the modeled region.

When a new track is created, a rectangular appearance model is created with the same size as the bounding box of the foreground region. The model is initialized by copying the pixels of the track's foreground component into the color model. The corresponding probabilities are initialized to 0.4, and pixels which did not correspond to this track are given zero initial probability.

On subsequent frames, the appearance model is updated by blending in the current foreground region. The color model is updated by blending the current image pixel with the color model for all foreground pixels, and all the probability mask values may be updated with the following formulae (for α=λ=0.95):

$$M_{RGB}(x, t) = M_{RGB}(x, t-1)\alpha + (1-\alpha)I(x) \text{ if } x \in \mathcal{F} \quad (8)$$

$$P_c(x, t) = P_c(x, t-1)\lambda \text{ if } x \notin \mathcal{F}$$

$$= P_c(x, t-1)\lambda + (1-\lambda) \text{ if } \in \mathcal{F}$$

In this way, a continuously updated model of the appearance of the pixels in a foreground region may be maintained, together with their observation probabilities. Thresholds may be applied to the observation probabilities, enabling treatment as a mask to find a boundary of the object, and which also gives information about non-rigid variations in the object, for instance retaining observation information about a whole region swept out by a pedestrian's legs.

Figure 5:
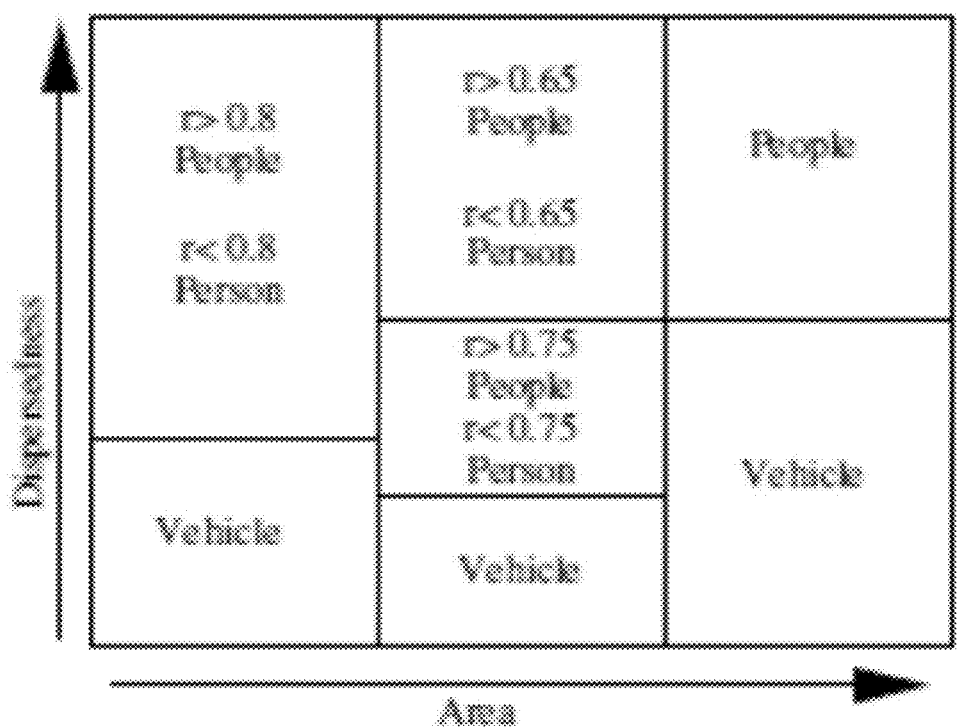
FIG. 5 is a graphical illustration of a rule-based object classification according to the present invention.

The object classifier 122 labels objects in a scene through a rules-based classifier. For example, objects may be classified by size and shape, or by type of object: single person, multiple people, vehicle, other, etc. Generally for each object, the object classifier 122 finds an area, length of contour and length and orientation of principal axes, and computes the "dispersedness" of the object, defined as the ratio of the perimeter squared to the area. Dispersedness has been found useful in distinguishing two-dimensional (2D) image objects of one or more people from those of individual vehicles. For each 2D image object, the object classifier 122 also determines which principal axis is most nearly vertical and computes a ratio $\{r\}$ of the more-nearly horizontal axis length to the more-nearly vertical axis length. FIG. 5 provides an illustration of a rule-based classification derived from the ratio $\{r\}$. For example, the ratio $\{r\}$ may be used to distinguish a foreground region of a single person from one representing multiple people; a single person's image is typically significantly taller than it is wide, while a multi-person blob grows in width with the number of visible people. In addition, temporal consistency may be used to improve robustness so that a cleanly tracked object, which is occasionally misclassified, can use its classification history to improve results.

The color classifier 126 tracks objects of specified colors. The color classifier 126 may be built on top of the color field tracker 124, to thereby perform color quantization on a frame-by-frame level and provide a specific color for each object tracked in a scene. In one embodiment, the color classifier 126 is a bi-conic color classifier that quantifies color information into colors by mapping RGB pixels for each video frame to a bi-conic Hue, Saturation, Lightness (HSL) color space defined by a vertical Lightness axis value ranging from white (full brightness) to black, angular Hue data, and radial color Saturation data. The HSL color space is quantified into colors by determining angular cutoffs between colors and lightness and saturation cutoffs, and then relabeling pixels as either white or black depending on whether they lie outside a derived lightness/saturation curve, or above or below a horizontal mid-plane in the HSL space. In one embodiment, the color classifier 126 quantifies the color information into six colors (black, white, red, blue, green, and yellow) by providing four cutoffs between hues: yellow/green, green/blue, blue/red, and red/yellow. In one example, for an outdoor urban scene video input the cutoffs are 60°, 150°, 225°, and −15°. The color classifier 126 further classified points above a horizontal plane in the HSL space (i.e., for sufficient lightness) and having intensity and saturation outside a defined curve as white, and those below the horizontal plane as black. Embodiments of the color classifier 126 may further create an accumulated histogram of the quantized colors and then select a dominant color of the object, for example the color with the largest number of votes in the histogram.

The tracking alert detector 128 generates alerts in response to object tracking output by the color field tracker 124. In some embodiments, a region of interest (ROI) is configured to represent a target region, and rules are specified to define region alert: for example, to trigger an alert to an object initiated inside or outside of the ROI, an object passing through the ROI, an object entering the ROI from outside, or a specified object ever being inside of the ROI. Location relativity may also be inferred by different parts of an object: for example, an object's head or topmost point), a centroid, a foot part or lowest point, or a whole entirety of an object. Some embodiments may also apply one or more sizing thresholds to target objects in order to trigger alerts.

A high activity level indicated/detected at 104 results in the example of FIG. 3 in the selection of a non-tracking-based analytic process/method comprising a color BGS classifier 132 and a non-tracking alert detector 134, more particularly performing color retrieval without object tracking. Some embodiments of the color BGS classifier 132 utilize color segmentation inside the foreground objects detected using background subtraction by applying a time interval (for example, two seconds, three seconds, and other time intervals may be practiced) and a size threshold per color. For each foreground object, colors are quantified, for example through the methods and systems described above with respect to the bi-conic color classifier 126, and segmentation is performed using connected component analysis for each color. Thus, for each color detect in each time interval, if a connected component of that color is found which is bigger than a predefined size threshold, a largest component for that color in the time interval is stored as a key frame for color retrieval.

Figure 6:
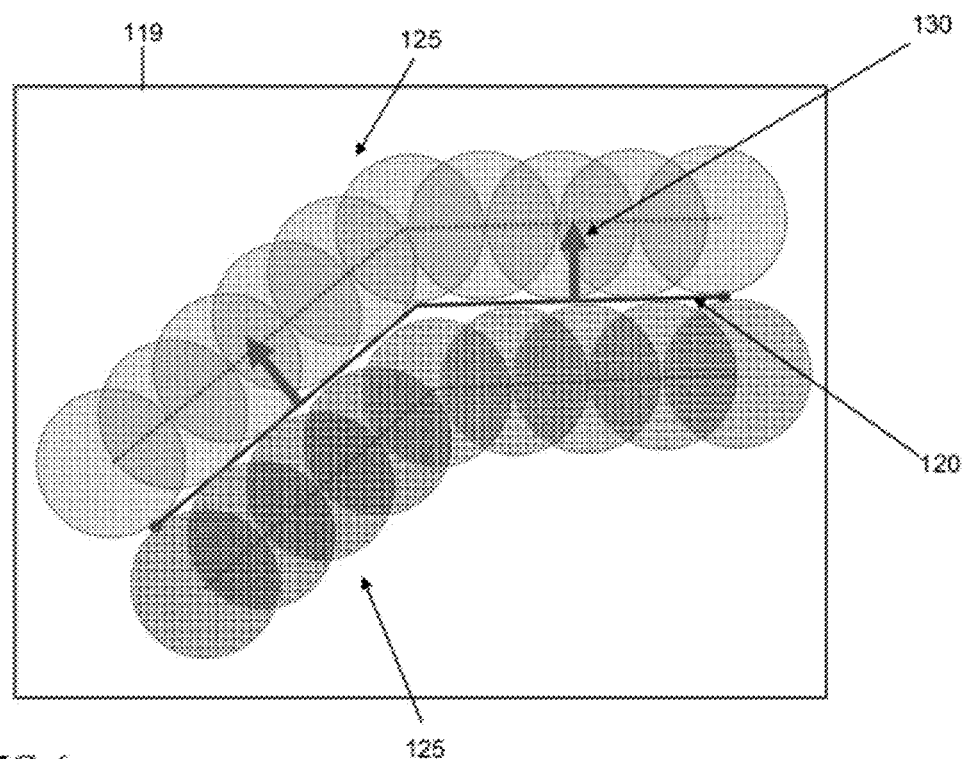
FIG. 6 is an illustration of an embodiment of a tripwire classifier according to the present invention.

With reference to FIG. 6, embodiments of the color BGS classifier 132 may also define a virtual boundary line 120 (i.e., a virtual tripwire) in a video image from region of interest 119. The virtual boundary line 120 is generally of arbitrary shape, which may be user-defined, and may be placed in a digital video using computer-based video processing techniques. Virtual boundary line 120 is monitored, statistics may be compiled, intrusions detected, events recorded, responses triggered, etc. More specifically the color BGS classifier 132 establishes a set of overlapping ground patch regions 125 along each side of the virtual boundary line 120. (It can be appreciated that each of the set of ground patch regions 125 is capable of taking on any number of geometries (e.g., square, rectangle, etc.), and is not limited to the overlapping circles depicted in FIG. 6).

The color BGS classifier 132 may thus process video data in real-time, identifying attributes of objects detected in the region of interest 119. Objects can be detected using a number of approaches, including, but not limited to: background modeling, object detection and tracking, spatial intensity field gradient analysis, diamond search block-based (DSBB) gradient descent motion estimation, or any other method for detecting and identifying objects captured by a sensor device. In an exemplary embodiment, the color BGS classifier 132 analyzes each ground patch region 125 to identify foreground objects within, and then computes current appearance features of the identified foreground objects. Specifically, a ground patch history model is updated with attributes extracted from each of set of ground patch regions 125. In an exemplary embodiment, extraction relates each attribute to a ground patch history model according to various attributes, including, but not limited to, appearance, color, texture, gradients, edge detection, motion characteristics, shape, spatial location, etc. Data associated with each of the extracted attributes is dynamically mapped into groups/models for each ground patch region, along with additional metadata that captures a more detailed description of the extracted attribute and/or objects. For example, one ground patch history model may comprise information about each ground patch region, including, but not limited to: ground patch region center location, ground patch region radius, timestamp, frame number, a list of history patch models (e.g., color histograms, appearance features, etc.), a list of neighboring ground patch regions in spatial proximity and/or on an opposite side of the virtual boundary line, or a patch motion vector indicating the general direction of motion for each ground patch region.

The ground patch history model is continuously updated and cross-referenced against attributes from previously received sensor data (i.e., video input) to determine if each ground patch region's appearance has changed. To accomplish this, the color BGS classifier 132 analyzes the updated ground patch history model to detect whether an object captured in at least one of a set of ground patch regions 125 is crossing virtual boundary line 120 in the video image. Specifically, the color BGS classifier 132 may analyze appearance features within the ground patch history model for each of a set of ground patch regions 125 and determine if a pair of similar ground patch regions is present among the set of ground patch regions 125 based on the appearance features within ground patch history model for each of set of ground patch regions 125.

The color BGS classifier 132 further determines locations of pairs of similar ground patch regions. For example, appearance similarities are compared between a specific patch being analyzed and neighboring ground patch regions on the other side of virtual boundary line 120. Directions of motion for each pair are compared, in the case that each of the pair is located on a different side of virtual boundary line 120 in the video region of interest 119. In some embodiments, pairs of similar ground patch regions are matched by imposing an attribute similarity constraint, the direction of the object movements in the pair then estimated using techniques such as optical flow estimation, affine transformation, smallest squared difference (SSD), etc. If the matched paired ground patch regions are due to the same object, their moving direction should be consistent (i.e., both patches have movement vectors pointing to the same side of the virtual boundary line), but if the pair matching is caused by different objects with similar appearances, the matched pair's moving directions will typically be different. Thus, by imposing this motion direction agreement constraint, false positives caused by matching different objects are reduced. To determine if an object is moving in a required direction, its motion direction may be compared with a virtual boundary line crossing direction 130 (e.g., inside (+) to outside (−), or vice versa).

Alerts are generated by the non-tracking alert detector 134 if a match is determined between the virtual boundary line crossing direction 130 and an object motion direction, the object detected as crossing the virtual boundary line 120 in the video region of interest 119, if the direction of motion for each of the pair of similar ground patch regions is substantially the same. Further, it will be noted that motion detection alerts by the non-tracking alert detector 134 may be triggered when the target region-of-interest (ROI) 119 possesses a sufficient amount of motion energy that lasts within a desired temporal interval, which may be selected or revised as needed, for example, one second, two seconds, five minutes, etc. Applications of this feature include loitering detection, ROI occupancy estimation, and object access detection. In urban scenes, the non-tracking alert detector 134 may provide simplified abandoned object alert, for example where parked vehicles may be detected by specifying an ROI 119 around a parking area. In contrast to the tracking alert detector 128 of the low-level analytics mode, motion detection alerts by the non-tracking alert detector 134 may consider the global motion energy of the ROI without distinction of individual objects.

The index writer 136 receives input from the non-tracking alert detector 134 and the tracking alert detector 128, and further receives data from the color classifier 126 and the object classifier 122 with respect to the tracking alert detector 128 data. In addition to providing real-time alerts and indexing thereof, the index writer 136 also enables data searching based on attributes extracted from the low and high level analytics, for example object type (person, vehicle), color, size, speed, human body parts, and many others. In some embodiments, these attributes are constantly ingested as XML metadata into a DB2 database as new events are detected. In one aspect, the index writer 136 enables composite searching by combining different visual attributes or even non-visual data captured from multiple data sources.

Figure 7:
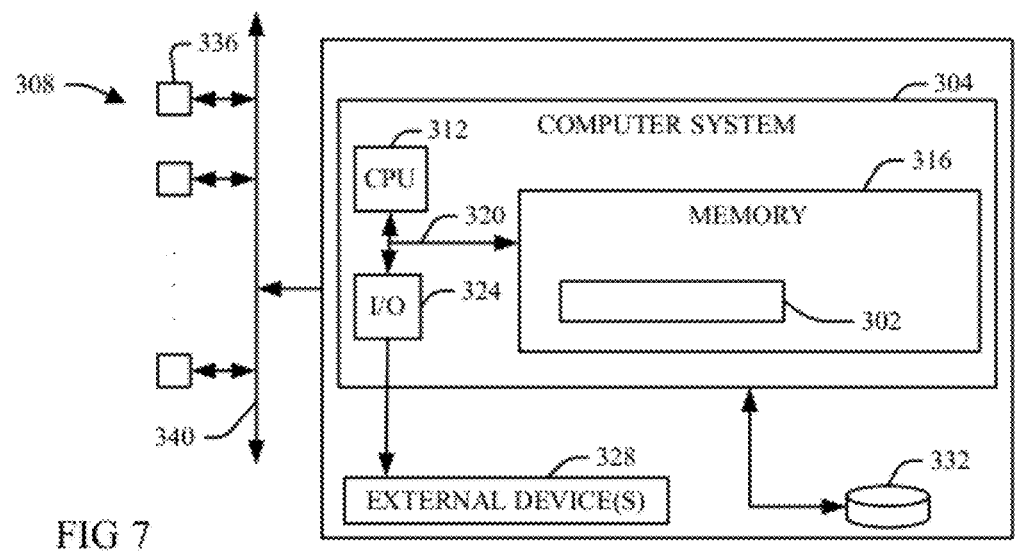
FIG. 7 is a computerized implementation of an embodiment of the present invention.

Referring now to FIG. 7, an exemplary computerized implementation of an embodiment of the present invention includes computer or other programmable devices 304 in communication with devices 336 (for example, a video camera or video server) that analyzes video data for determination of object movement according to the present invention, for example in response to computer readable code 302 in a file residing in a memory 316 or a storage system 332 through a computer network infrastructure 308. The implementation is intended to demonstrate, among other things, that the present invention could be implemented within a network environment (e.g., the Internet, a wide area network (WAN), a local area network (LAN) or a virtual private network (VPN), etc.) Communication throughout the network 308 can occur via any combination of various types of communication links: for example, communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, the network infrastructure 308 is intended to demonstrate that an application of an embodiment of the invention can be deployed, managed, serviced, etc. by a service provider who offers to implement, deploy, and/or perform the functions of the present invention for others.

The computer 304 comprises various components, some of which are illustrated within the computer 304. More particularly, as shown, the computer 304 includes a processing unit (CPU) 312 in communication with one or more external I/O devices/resources 328 and storage systems 332. In general, the processing unit 312 may execute computer program code, such as the code to implement one or more of the process steps illustrated in FIG. 1, which is stored in the memory 316 and/or the storage system 332.

The network infrastructure 308 is only illustrative of various types of computer infrastructures for implementing the invention. For example, in one embodiment, computer infrastructure 308 comprises two or more computing devices (e.g., a server cluster) that communicate over a network. Moreover, the computer 304 is only representative of various possible computer systems that can include numerous combinations of hardware. To this extent, in other embodiments, the computer 304 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations. Further, I/O interfaces 328 can comprise any system for exchanging information with one or more of an external server and or client (not shown). Still further, it is understood that one or more additional components (e.g., system software, math co-processing unit, etc.) not shown can be included in the computer 304 or server or client.

One embodiment performs process steps of the invention on a subscription, advertising, and/or fee basis. That is, a service provider could offer to provide automated analysis of video data for determination of object movement. In this case, the service provider can create, maintain, and support, etc., a computer infrastructure, such as the network computer infrastructure 308 that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing one or more of the processes, systems and articles for automated analysis of video data for determination of object movement described above. In this case, a computer infrastructure, such as the computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as the computers/devices 304/336, from a computer-readable medium; (2) adding one or more computing devices to the computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary," one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for multi-mode video event indexing, the method comprising:

applying background subtraction via a programmable hardware device to a video stream input to detect foreground object activity as a difference between current frame image information and static information of a contextual background of video input images from the video stream input;

determining a level of the detected foreground object activity with respect to the video input images from the video stream input;

selecting from a plurality of video analytics modes and applying an object tracking-based analytic mode via a hardware device to the detected foreground object activity of the video input images to track a foreground object, in response to the determined level of detected quality of the detected foreground object activity meeting a threshold level of quality;

selecting from the plurality of video analytics modes and applying a non-object tracking-based analytic mode to the detected foreground object activity of the video input images via a hardware device to determine object movement from extracted foreground object appearance attributes without tracking the foreground object, in response to the determined level of detected quality of the detected foreground object activity not meeting the threshold level of quality; and writing results of the tracking the foreground object and the object movement determination from the extracted foreground object appearance attributes to an index.

2. The method of claim 1, wherein the determining the level of the detected foreground object activity comprises:

determining a density of the foreground relative to an entirety of the image; and wherein the threshold level of activity is a density value.

3. The method of claim 2, wherein the selecting the object tracking-based mode further comprises:

determining if a first density of the foreground relative to the entirety of the image is greater than or equal to the threshold density value at a first time;

determining if a second density of the foreground relative to the entirety of the image is less than a minimum value that is less than the threshold density value at a second time subsequent to the first time;

determining an elapsed time between the first and the second times;

comparing the elapsed time to a stability time period; and
selecting the object tracking-based mode if the elapsed time is less than the stability time period.

4. The method of claim 2, wherein the selecting the object tracking-based mode further comprises:
determining a time duration that the density of the foreground is greater than or equal to the threshold level of activity;
comparing the time duration to a specified time period;
selecting the object tracking-based mode if the time duration is less than the specified time period.

5. The method of claim 4, wherein the density of the foreground is an average of a plurality of individual densities over the specified time period.

6. The method of claim 5, further comprising:
determining the average of the plurality of individual densities over the specified time period by weighting a more recent density higher than an older density.

7. A computer system for multi-mode video event indexing, the computer system comprising:
a processing unit, computer-readable memory and a computer-readable storage system;
fourth program instructions to apply background subtraction to a video stream input to detect foreground object activity as a difference between current frame image information and static information of a contextual background of video input images from the video stream input;
first program instructions to determine the quality of object distinctiveness by determining a level of the detected foreground object activity with respect to the video input images from the video stream input;
second program instructions to select from a plurality of video analytics modes and apply an object tracking-based mode to the detected foreground object activity of the video input to track a foreground object, in response to the determined level of detected quality of object distinctiveness meeting a threshold level of quality;
third program instructions to select from the plurality of video analytics modes and apply a non-object tracking-based to the detected foreground object activity of the video input images to determine object movement from extracted foreground object appearance attributes without tracking the foreground object, in response to the determined level of detected quality of the detected foreground object activity not meeting the threshold level of quality; and
fifth program instructions to write results of the tracking the foreground object and the object movement determination from the extracted foreground object appearance attributes to an index; and
wherein the first, second, third, fourth and fifth program instructions are stored on the computer-readable storage system for execution by the processing unit via the computer-readable memory.

8. The computer system of claim 7, wherein the first program instructions are further to determine the level of the detected foreground object activity as a density of the foreground relative to an entirety of the image; and
wherein the threshold level of activity is a density value.

9. The computer system of claim 8, wherein the second program instructions are to select and apply the object tracking-based mode by:
determining a time duration that the density of the foreground is greater than or equal to the threshold level of activity;
comparing the time duration to a specified time period; and
selecting the object tracking-based mode if the time duration is less than the specified time period.

10. The computer system of claim 8, wherein the second program instructions are to select and apply the object tracking-based mode by:
determining if a first density of the foreground relative to the entirety of the image is greater than or equal to the threshold density value at a first time;
determining if a second density of the foreground relative to the entirety of the image is less than a minimum value that is less than the threshold density value at a second time subsequent to the first time;
determining an elapsed time between the first and the second times;
comparing the elapsed time to a stability time period; and
selecting the object tracking-based mode in response to determining that the elapsed time is less than the stability time period.

11. The computer system of claim 10, wherein the second program instructions are further to determine the density of the foreground as an average of a plurality of individual densities over the specified time period.

12. The computer system of claim 11, wherein the second program instructions are further to determine the average of the plurality of individual densities over the specified time period by weighting a more recent density higher than an older density.

13. A computer program product for multi-mode video event indexing, the computer program product comprising:
a computer-readable tangible storage device having computer-readable program code embodied therewith, the computer-readable program code comprising instructions that, when executed by a computer processing unit, cause the computer processing unit to:
apply background subtraction to a video stream input to detect foreground object activity as a difference between current frame image information and static information of a contextual background of video input images from the video stream input;
determine a level of the detected foreground object activity with respect to the video input images from the video stream input;
select from a plurality of video analytics modes and apply an object tracking-based analytic mode to the detected foreground object activity of the video input images to track a foreground object, in response to the determined level of detected quality of the detected foreground object activity meeting a threshold level of quality;
select from the plurality of video analytics modes and apply a non-object tracking-based analytic mode to the detected foreground object activity of the video input images to determine object movement from extracted foreground object appearance attributes without tracking the foreground object, in response to the determined level of detected quality of the detected foreground object activity not meeting the threshold level of quality; and
write results of the tracking of the foreground object and the object movement determination from the extracted foreground object appearance attributes to an index.

14. The computer program product of claim 13, wherein the computer-readable program code instructions, when executed by the computer processing unit, further cause the computer processing unit to determine the level of the detected foreground object activity by determining a density of the foreground relative to an entirety of the image; and
wherein the threshold level of activity is a density value.

15. The computer program product of claim 14, wherein the computer-readable program code instructions, when executed by the computer processing unit, further cause the computer processing unit to select the object tracking-based mode in response to:
- determining if a first density of the foreground relative to the entirety of the image is greater than or equal to the threshold density value at a first time;
- determining if a second density of the foreground relative to the entirety of the image is less than a minimum value that is less than the threshold density value at a second time subsequent to the first time;
- determining an elapsed time between the first and the second times;
- comparing the elapsed time to a stability time period; and
- selecting the object tracking-based mode in response to determining that the elapsed time is less than the stability time period.

16. The computer program product of claim 15, wherein the computer-readable program code instructions, when executed by the computer processing unit, further cause the computer processing unit to select the object tracking-based mode by:
- determining a time duration that the density of the foreground is greater than or equal to the threshold level of activity;
- comparing the time duration to a specified time period;
- selecting the object tracking-based mode in response to determining that the time duration is less than the specified time period.

17. The computer program product of claim 16, wherein the computer-readable program code instructions, when executed by the computer processing unit, further cause the computer processing unit to determine the density of the foreground as an average of a plurality of individual densities over the specified time period.

18. The computer program product of claim 17, wherein the computer-readable program code instructions, when executed by the computer processing unit, further cause the computer processing unit to determine the average of the plurality of individual densities over the specified time period by weighting a more recent density higher than an older density.

19. A method of providing a service for multi-mode video event indexing, the method comprising:
- integrating computer-readable program code into a computer system comprising a processing unit, a computer-readable memory and a computer-readable tangible storage device;
- wherein the computer-readable program code is embodied on the computer-readable tangible storage device and comprises instructions that, when executed by the processing unit via the computer-readable memory, cause the processing unit to:
- apply background subtraction to a video stream input to detect foreground object activity as a difference between current frame image information and static information of a contextual background of video input images from the video stream input;
- determine a level of the detected foreground object activity with respect to the video input images from the video stream input;
- select from a plurality of video analytics modes and apply an object tracking-based analytic mode to the detected foreground object activity of the video input images to track a foreground object, in response to the determined level of detected quality of the detected foreground object activity meeting a threshold level of quality;
- select from the plurality of video analytics modes and apply a non-object tracking-based analytic mode to the detected foreground object activity of the video input images to determine object movement from extracted foreground object appearance attributes without tracking the foreground object, in response to the determined level of detected quality of the detected foreground object activity not meeting the threshold level of quality; and
- write results of the tracking of the foreground object and the object movement determination from the extracted foreground object appearance attributes to an index.

20. The method of claim 19, wherein the computer-readable program code instructions, when executed by the computer processing unit, further cause the computer processing unit to determine the level of the detected foreground object activity by determining a density of the foreground relative to an entirety of the image; and
wherein the threshold level of activity is a density value.

21. The method of claim 20, wherein the computer-readable program code instructions, when executed by the computer processing unit, further cause the computer processing unit to select the object tracking-based mode in response to:
- determining if a first density of the foreground relative to the entirety of the image is greater than or equal to the threshold density value at a first time;
- determining if a second density of the foreground relative to the entirety of the image is less than a minimum value that is less than the threshold density value at a second time subsequent to the first time;
- determining an elapsed time between the first and the second times;
- comparing the elapsed time to a stability time period; and
- selecting the object tracking-based mode in response to determining that the elapsed time is less than the stability time period.

22. The method of claim 21, wherein the computer-readable program code instructions, when executed by the computer processing unit, further cause the computer processing unit to select the object tracking-based mode by:
- determining a time duration that the density of the foreground is greater than or equal to the threshold level of activity;
- comparing the time duration to a specified time period;
- selecting the object tracking-based mode in response to determining that the time duration is less than the specified time period.

23. The method of claim 22, wherein the computer-readable program code instructions, when executed by the computer processing unit, further cause the computer processing unit to determine the density of the foreground as an average of a plurality of individual densities over the specified time period.

24. The method of claim 23, wherein the computer-readable program code instructions, when executed by the computer processing unit, further cause the computer processing unit to determine the average of the plurality of individual densities over the specified time period by weighting a more recent density higher than an older density.

* * * * *